Dec. 29, 1953  F. M. DARNER ET AL  2,664,352
PROCESS AND APPARATUS FOR REDUCING FERROUS
CHLORIDE IN LIQUID FORM TO ELEMENTAL IRON
Filed Oct. 3, 1950
2 Sheets-Sheet 1
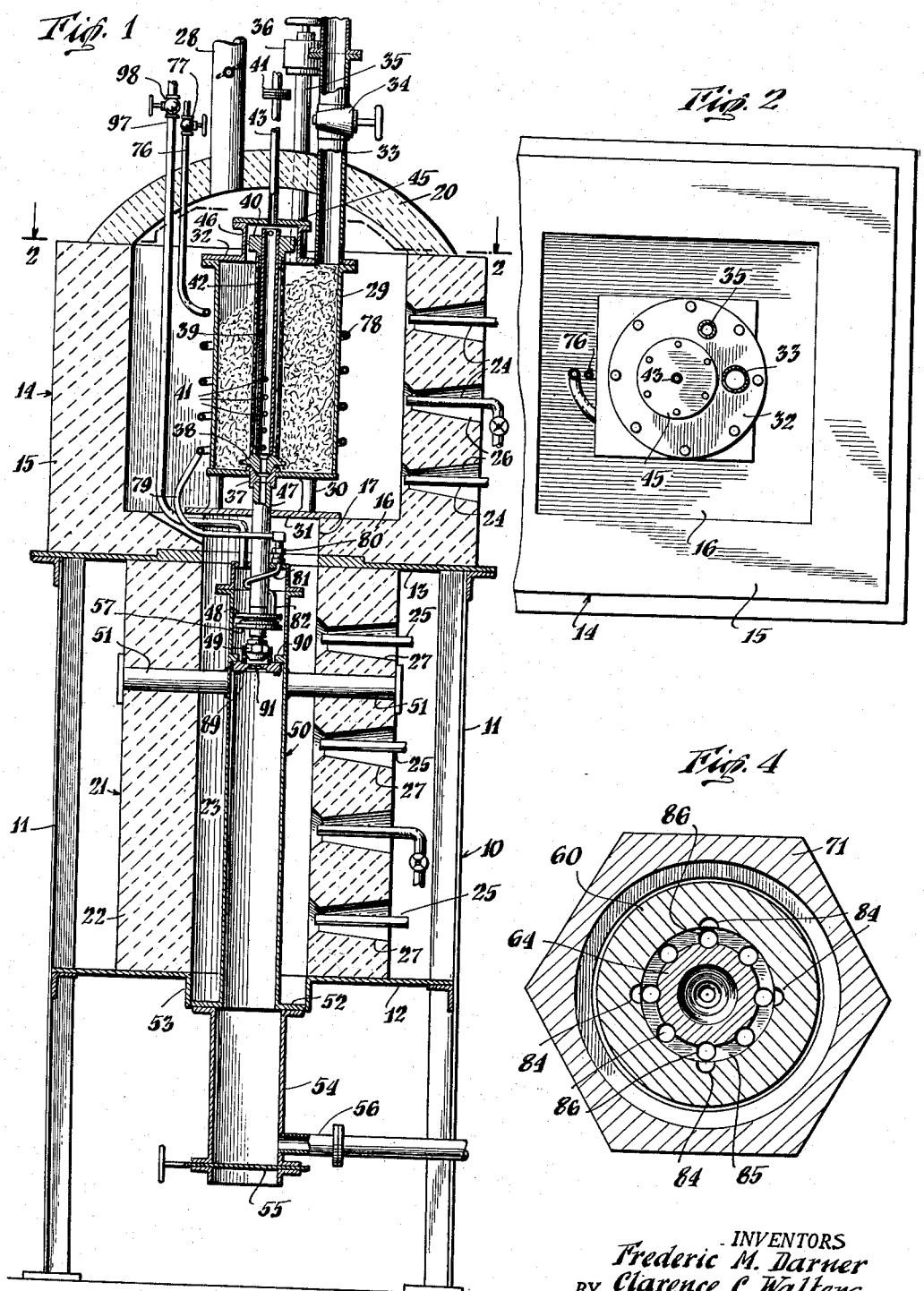
INVENTORS
Frederic M. Darner
BY Clarence C. Walters
Robert S. Dunham
ATTORNEY

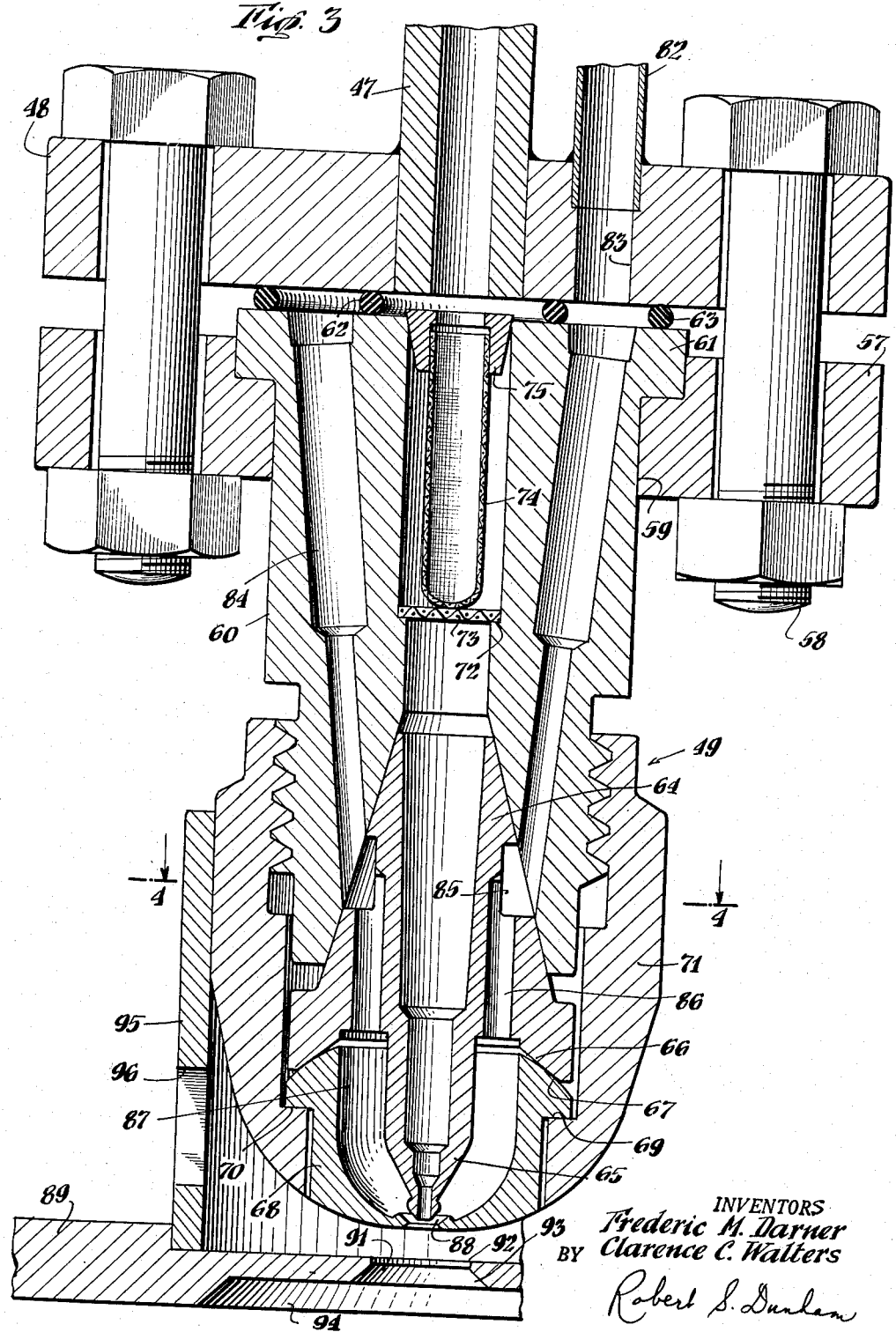

Patented Dec. 29, 1953

2,664,352

UNITED STATES PATENT OFFICE 2,664,352

PROCESS AND APPARATUS FOR REDUCING FERROUS CHLORIDE IN LIQUID FORM TO ELEMENTAL IRON

Frederic M. Darner, Shaker Heights, and Clarence C. Walters, Willoughby, Ohio, assignors, by mesne assignments, to Republic Steel Corporation, Cleveland, Ohio, a corporation of New Jersey Application October 3, 1950, Serial No. 188,128

14 Claims. (Cl. 75—34)

This invention relates to a process and apparatus for reducing ferrous chloride in liquid form to elemental iron. More particularly, the invention relates to a process and apparatus by which solid ferrous chloride is heated to convert it to liquid form, then caused to flow through a nozzle into a reaction chamber. As it leaves the nozzle, the liquid ferrous chloride is broken down into small droplets, which are distributed as a spray or fog in the reaction chamber. Hydrogen is introduced into the reaction chamber separately from the ferrous chloride and in such a way that the initial contact between the hydrogen and the ferrous chloride takes place after the latter has been sub-divided into small droplets and has passed beyond the nozzle into the reaction chamber. Special provisions are made for insuring this action. The ferrous chloride droplets then react with hydrogen to form elemental iron and gaseous hydrogen chloride. The products of the reaction are suitably disposed of in a way which per se forms no part of the present invention.

The present invention has a useful function as one step of an over all process by which iron in a form in which it may occur in nature, or a form to which it may be converted from its initial form, is first reacted with a halogen such as chlorine or some chloride so that ferrous chloride is produced. This ferrous chloride may then be treated in accordance with the present invention to convert the iron to its elemental form. This process as a whole is one way in which iron values may be recovered from naturally occurring materials, some of which are not suitable in character or in iron concentration for treatment in accordance with conventional metallurgical practices now used on iron ore.

It has been suggested in the past that ferrous chloride could be reduced with hydrogen to form elemental iron. However, as far as is known such suggestions as have been made in the prior art are not commercially practicable, and more particularly, do not include certain essential steps of the present process, which involves first a subdivision of ferrous chloride in liquid form into small droplets, then the reaction of these small droplets with hydrogen, while substantially in suspension, to form elemental iron.

When the present invention was being developed, it was found that while ferrous chloride reacts quite readily with hydrogen at temperatures at which the ferrous chloride is molten, even though this reaction is endothermic in character, numerous and for a time insuperable difficulties were met, in that the reaction seemed to occur to some extent at least at a point closely adjacent to the tip of the nozzle through which ferrous chloride was introduced into a reaction chamber. These difficulties first appeared when hydrogen and ferrous chloride were supplied through the nozzle and no separate and intervening atomizing gas, neutral in character, was used. The iron so produced deposited in the gas passage of the nozzle and quickly plugged it against further flow of gas therethrough. It was necessary, therefore, to design special apparatus permitting the reaction to take place away from the nozzle so that the nozzle could be used for a substantial period of time without undesired plugging. The provisions of such an apparatus is a further part of the present invention.

Summarizing the present invention, therefore, it includes, from an apparatus point of view, a means in which ferrous chloride may be melted to convert it to a molten state, then a nozzle through which the molten ferrous chloride may be caused to flow and by which it may be dispersed in a finely divided condition, i. e., as small droplets, in a reaction chamber. Provision must be made for the supplying of hydrogen to the reaction chamber in a manner separate from the ferrous chloride. Furthermore, and what is particularly important to the operability of the present process, provision must be made for preventing initial contact between the hydrogen and the molten ferrous chloride until after the latter has been subdivided or broken down into small droplets and those droplets have moved out of contact with the nozzle and into the reaction chamber. The reaction occurs when the droplets are in effect in suspension in the chamber, i. e., dispersed in the atmosphere thereof. The present invention further includes the method or process of carrying on the reaction, including the steps of melting the ferrous chloride (unless it is originally supplied in molten condition), the step of introducing the molten ferrous chloride into a reaction chamber, and separately introducing the hydrogen into this chamber, and the step of preventing initial contact between hydrogen and the ferrous chloride until the latter has been broken up into small droplets and has passed into the chamber to a point spaced from the nozzle.

The specific details of the nozzle, which is illustrated accurately in the drawings, form per se no part of the present invention, in that this is but one possible type of nozzle by which the necessary action in accordance with the present invention may be carried out, and further in that the nozzle particularly illustrated in the accompanying drawings has possible uses apart from its use in conjunction with the present invention. This nozzle is particularly illustrated and described and claimed in a copending application of Walters, one of the present co-inventors, Ser. No. 190,520, filed October 17, 1950.

Furthermore, the means by which the products of the reaction are separated from one another and separately used or reused in some manner forms no necessary part of the present invention and will not be particularly disclosed herein.

Summarizing further as to the details of the present invention, from a more specific point of view than has been discussed hereinabove, it is preferred to use a neutral gas, such as nitrogen, supplied through the nozzle structure and provided as a part of the present apparatus and for a two-fold purpose. In the first place, the inert gas, as nitrogen, is preferably supplied as an annular stream surrounding and usually concentric with a central axial flow passage for ferrous chloride. This annular stream of an inert gas serves as a shield to prevent premature initial contact between hydrogen, which is separately supplied, and ferrous chloride until the latter has been broken down into small droplets and those droplets have moved away from the nozzle into the reaction chamber. As the second function of the inert gas, it may and preferably is used as an atomizing gas for the purpose of breaking down the flowing stream of ferrous chloride into small droplets and dispersing such droplets into the atmosphere in the reaction chamber.

Other and more detailed objects and advantages of the present invention and details of the structure or apparatus usable therewith and forming a part thereof will become apparent from the following description and appended claims when considered in connection with the accompanying drawings, in which:

Figure 1 is a somewhat diagrammatic view, principally in central vertical section, of an apparatus in accordance with the present invention and one in which the process of this invention may be carried out;

Fig. 2 is a fragmentary view, principally in plan, substantially as seen on the line 2—2 of Fig. 1;

Fig. 3 is a detailed view, substantially in central vertical section, illustrating the nozzle construction and its relation to the hydrogen inlet, the view being on a larger scale than that of Fig. 1; and Fig. 4 is a view substantially in horizontal section on the line 4—4 of Fig. 3.

In the accompanying drawings there is illustrated one type of apparatus embodying the present invention and by the use of which the process of the present invention may be performed. It will be understood by those skilled in the art from the following description, that the apparatus as a whole and more particularly individual parts thereof may be substituted by equivalents. The requirements and essential characteristics of each structural element and the interrelationships therebetween will be given, so that equivalencies may be reasonably determined from the description.

Turning now to the accompanying drawings, there is illustrated as a single composite apparatus, a means in which ferrous chloride may be melted or caused to assume a molten state, passage means including suitable filters for filtering out unmelted and insoluble materials, a nozzle through which ferrous chloride may be supplied and by the use of which it may be broken down into small droplets, a reaction chamber having means for controlling the temperature of its walls, and certain other necessary appurtenances. All these means are shown generally in Fig. 1 of the drawings.

Referring now more particularly to Fig. 1, there is illustrated apparatus embodying the present invention as aforesaid, which apparatus is arranged substantially vertically and is generally in the form of a pair of superposed and connected furnaces designed for independent temperature control and enclosing the other apparatus hereinabove mentioned. The structure as a whole may be supported upon a suitable framework, as of structural steel or any desired construction having the necessary mechanical strength. As shown, a framework structure 10 is made up of a plurality of upright angles 11 connected to one another by suitable plates 12 and 13, these plates being connected to the angles 11 by conventional brackets as shown. Supported upon the plate 13 is a furnace structure generally indicated at 14 and including side walls 15 and a bottom wall 16, the latter having a large aperture 17 centrally thereof to accommodate the apparatus within the furnace and later to be described. The furnace 14 may be built of any suitable materials, usually of a refractory nature. A suitable top or cover portion 20 may be provided as shown to close the upper end of the furnace 14, this cover being provided with suitable openings for several pipes and for the exhaust of products of combustion as will be described hereinafter. The plate 13 has an aperture centrally thereof of substantially the same size and shape as the aperture 17 and coincident therewith, these apertures preferably being cylindrical in shape, although this shape is not essential.

Extending substantially the entire distance between the plates 12 and 13 is a lower furnace 21 formed substantially as a hollow cylindrical body 22 of suitable refractory material. The central chamber 23 in the body 22 is also preferably substantially cylindrical and as shown may have the same diameter as the aperture 17 in the bottom 16 of the upper furnace 14. Each of the furnaces 14 and 21 are provided with heating means, here shown as a plurality of fluid fuel burners, three such burners 24 being shown for heating the upper furnace 14 and four similar burners 25 being shown for heating the lower furnace 21. It will be understood that the number of these burners is not critical; that any desired number may be used for either or both furnaces, not necessarily the same number; and that the burner or burners provided for each furnace may be disposed at any angle or angles in respect thereto and at any desired level or levels. Each of these burners may be arranged to burn any available fluid fuel, including both liquid and gaseous fuel. Alternatively, any other means desired or available may be used for supplying heat to the interiors of the two furnaces 14 and 21, the only requirement being that the heat supplied shall be under independent control as to each furnace respectively. While no particular control means is shown herewith, it will be understood that any suitable means effective for this purpose, such as valves in the fuel lines, could be used as will be obvious to those skilled in the art. As shown, each of the burners 24 and 25 is directed through a burner opening as shown at 26 and 27 respectively, so that combustion-supporting air may be drawn into the furnace through the openings through which the fuel is supplied. Alternatively, any other way of supplying combustion-supporting air known to the art may be used. Products of combustion from the central chamber 23 of the lower furnace 21 may pass upwardly into the combustion space of the furnace 14; and all products of combustion may then pass from this furnace through a suitable passage 28 or a stack to be released at any suitable point. Any desired draft control means may be provided such as dampers between the furnaces 14 and 21 or in the stack passage 28, or both. Such means, however, are not shown herein as they are entirely conventional in character.

Within the upper furnace 14 is a container 29 which serves as a melting chamber for ferrous chloride. The container 29 is supported by one or more intermediate legs or supports 30 from a supporting element 31 which rests upon the bottom 16 of the upper furnace as shown. It will be understood that the supporting element 31 is not an imperforate plate, closing over the entire cross sectional area of the aperture 17, as it is necessary for exhaust gases from the central chamber 23 of the lower furnace to pass to the upper furnace enroute to the stack passage 28. The container 29 has a suitable top member 32, by which it is closed with the exception of certain access openings for particular purposes as hereinafter described. Through the top 32 extends a pipe 33 for the supplying of solid ferrous chloride to the container 29, this material being supplied in any suitable way, and the pipe 33 preferably being provided with suitable closing means here shown as a gate valve 34, the purpose of which will be evident from the following description.

Also arranged for connection with the interior of the container 29 is a pipe 35 through which a gas, preferably inert in character, such as nitrogen, may be supplied for imposing upon the molten ferrous chloride in the container 29 a predetermined desired hydrostatic pressure. The gas supplied may be controlled by a suitable valve 36 in the pipe 35.

Somewhat eccentric of the center of the bottom of the container 29 is a suitable fitting 37 having an aperture therethrough for the flow of liquid ferrous chloride from the container 29. This fitting also has its upper surface arranged as a seat for receiving a complementary fitting 38. This fitting 38 supports a central perforated pipe 39, which carries at its upper end a member 40. As shown, the pipe 39 is supplied with a plurality of perforations 41 in its lower portion. Surrounding the pipe 39 and extending between the fitting 38 and the member 40, is an annular screen 42. Thus, upon being melted, the molten ferrous chloride must flow through the screen 42 and thence through the perforations 41 to the inside of the pipe 39 before passing through aligned openings in the fittings 38 and 37 in passing out of the container 29.

Extending downwardly from the fitting 37 and preferably secured as by welding or otherwise to the supporting element 31 is a pipe or duct 47. At its lower end, the pipe 47 carries a crosshead 48 as shown in Fig. 3, which in turn carries a nozzle generally indicated at 49. It will be noted from Fig. 3 that the pipe 47 and the nozzle 49 are provided with an axial through passage for molten ferrous chloride, as will be described more in detail hereinafter.

Suitably secured around the outside of the pipe 47 is the upper end portion of a reaction chamber generally indicated at 50, and which may be formed as shown as a substantially cylindrical container extending from about the top of the furnace 21 downwardly to a level slightly below the lower end thereof. This reaction chamber may be formed cylindrical as shown, or of any desired contour. The dimensions are not critical as to height or diameter or the ratio therebetween. It preferably should provide a sufficient volume so as to accommodate the reaction which is to take place therein. This reaction chamber may be formed as shown as a metal pipe of substantial diameter. It may be supported from the structure of the lower furnace or the main framework structure 10 in any suitable manner. As shown, there are provided a number of substantially radially arranged posts 51 which pass through suitable apertures in the wall of the lower furnace 21, the posts 51 being welded or otherwise secured to the outer walls of the reaction chamber 50. Any suitable way of supporting the reaction chamber in a desired position in respect to the nozzle 49 may be employed.

Further as shown, the reaction chamber 50 has an outwardly extending flange 52 at its lower end, which is preferably suitably connected either to the lower end of the furnace 21 or to the plate 12 as shown by a shield or baffle 53. This shield 53 may be formed as a substantially cylindrical sheet metal member, or in any other desired manner. This baffle completes the definition of the combustion space in the lower furnace 21, that is, the central chamber 23 around the reaction chamber 50.

Suitably coupled in a manner not shown to the flange 52 or to the reaction chamber 50 is a suitable receiving chamber 54, preferably having a removable bottom portion, shown as a sliding valve member 55, so as to permit of access to the interior thereof. There is also provided in communication with the chamber 54 a pipe 56 for the exhaust of gaseous products from the reaction chamber 50 and any unreacted materials which will flow out through this pipe.

Supported from the crosshead 48 is the nozzle 49 as aforesaid. This support is effected by a crosshead 57 similar to the crosshead 48 and arranged to be removably secured thereto by a plurality of nuts and bolts 58. The crosshead 57 has a central bore 59 for receiving a member 60 of the nozzle. The member 60 has an outwardly extending flange 61 seated in a suitable recess provided around the bore 59 as shown, so as positively to support the nozzle 49. Disposed between the upper surface of the member 60 and the underside of the crosshead 48 are a pair of substantially concentrically arranged annular metal wires 62 and 63 serving as gaskets. These annular wires may be of some suitable soft metal, such as aluminum or an alloy thereof, and serve to prevent communication between the central passage for molten ferrous chloride, which is confined inside the annular wire 62, and a passage means hereinafter described for a shielding and atomizing gas, such as nitrogen, which is kept confined between the annular wires 62 and 63.

In some instances, it may be desired to provide an arrangement for controlling the starting of the operation of the device, which arrangement in fact has been used in conjunction therewith. For this purpose, a thin diaphragm of some suitable material, as thin sheet metal, may be interposed across the passage for liquid ferrous chloride, for example, between the annular wires 62 and 63 and the underside of the crosshead 48. This diaphragm preferably has a hole therein positioned in alignment with the passage 83 hereinafter described. The diaphragm is not particularly shown in the present drawings as it is of a thickness comparable with that of the line showing the underside of the crosshead 48 as seen in Fig. 3. With the diaphragm initially imperforate, at least in the area in alignment with the central axial passage for molten ferrous chloride, the ferrous chloride in the container 29 may be heated and melted at least in part. When it is desired to initiate a flow of ferrous chloride in molten condition from the container 29, the diaphragm may be punctured by a suitable puncturing device. Such a device may comprise a substantially cylindrical punch member 43 having a suitable head or coupling 44 and being mounted for sliding movement in an aperture in the cover portion 20 of the furnace and in an aligned aperture in a cover 45 for an extension portion 46 of the top member 32 of the container 29. In starting the flow of molten ferrous chloride, the punch member 43 may be depressed in any suitable manner to puncture the diaphragm aforesaid and then raised again to permit a free flow of the molten ferrous chloride from the container 29 through the hole thus formed in the diaphragm to and through the nozzle. The extension 46 of the top member 32 may serve also to center the member 40 and members 39 and 42. At the same time, if it is desired merely to remove the members 40, 39, 42 and 38, this may be done without removing the top member 32 of the container 29 by merely removing the cover 45 and drawing the other members listed upwardly through the hole thereby provided.

The lower end of the member 60 is provided with a frusto-conical recess, within which is seated an inner nozzle member 64 having a central portion 65 which extends downwardly to form a nozzle for the ferrous chloride, there being a central through passage for the molten ferrous chloride through nozzle members 60 and 64. Surrounding the central portion 65, and on the underside as shown in Fig. 3 of an outwardly extending portion of the member 64, is a frusto-conical seating surface 66, engaged with which is an upper, substantially spherical surface 67 on the upper end of an outer nozzle member 68. The nozzle member 68 has a downwardly directed shoulder 69 arranged to be engaged by an upwardly directed shoulder 70 of an outer nut member 71, which is threaded as shown onto suitable screw threads formed on the lower outer portion of the member 60. This nut member thus serves to confine all the parts of the nozzle 49 and to hold them in a desired assembled position.

Within the member 60 and located in the central axial passage thereof there may be located a further means for screening out of the molten ferrous chloride any solid material in suspension therein. As shown, this is provided by forming the axial passage of two diameters meeting at a shoulder 72, which serves to support a relatively heavy screen 73. Resting upon the screen 73 is a cup-shaped screen or filter member 74 having its upper open end loosely received within a tapered hollow plug 75, which is seated in the upper end of the through passage as shown. The members 73, 74 and 75 may be removed for cleaning, replacement or repair as may be necessary.

Means are also provided for conducting a screening and preferably also atomizing gas to and through the nozzle. Such a gas is preferably chemically inert in character, at least in respect to molten ferrous chloride. One such gas, which has been used in this manner and which is contemplated for such use, is nitrogen. As the reaction, as a whole, of reducing liquid ferrous chloride with hydrogen is endothermic in character, it is usually desired to introduce this gas in a heated condition, so as to maintain the desired temperatures in the reaction chamber. For this purpose a suitable gas, such as nitrogen, is supplied through a pipe 76, Fig. 1, preferably under control of a suitable valve 77. The pipe 76 is led through a suitable aperture in the furnace cover portion 20, and this pipe, or a pipe suitably coupled thereto, is exposed to the heat in the furnace 14, so that the gas flowing therefrom may be heated to a desired extent. Any other means for heating this gas known in the art and which is found to be operative in practice may be used if desired. As shown, there is a coil portion 78 of the pipe 76 disposed around the container 29 and within the furnace 14. The lower end of the coil portion 78 is then connected by a pipe 79 through a coupling 80 with a further coiled pipe 81 which is subject to heat from the lower furnace 21 and thence to a pipe 82 extending into the crosshead 48 and communicating with a passage 83 therethrough. The passage 83 communicates with the space between the crosshead and the upper surface of the member 60 which is defined laterally by the annular wires 62 and 63. The gas thus flows completely around the annular space between these wires.

Extending through the member 60 are a plurality of inclined bores 84, four in number as shown, see Fig. 4. These bores communicate at their upper ends with the annular space between the wires 62 and 63. At their lower ends, the bores 84 communicate with an annular groove 85 formed in the inner nozzle member 64. This groove 85 serves to redistribute gas supplied thereto through the bores 84 and to pass this gas to a plurality of longitudinal bores 86, of which there are eight in the form shown, see Fig. 4. At their lower ends the bores 86 communicate with an annular space 87 formed between the central portion 65 of the nozzle member 64 and the outer nozzle member 68. This space 87 acts as a plenum chamber for the gas. The gas flows from this chamber as an annular and inwardly directed stream through an annular nozzle opening 88.

The shape and character of this nozzle opening is shown fairly accurately in the accompanying drawing, Fig. 3. The essential features of this opening and the particular relationship of its several dimensions and angles form the subject matter of the copending application of Walters (Serial No. 190,520) as aforesaid and hence will not be described in detail herein. For the purpose of the present application, it is sufficient to state that the gas passes outwardly as a substantially hollow conical stream in a direction to intersect, at the apex of the cone, the center line of the stream of liquid ferrous chloride at a point spaced a predetermined distance beyond the nozzle. In this way the gas may serve as a shielding gas to prevent premature contact between hydrogen, which is separately supplied to the reaction chamber as hereinafter set forth, and the liquid ferrous chloride until the latter has been broken up into small droplets and those droplets have moved away from the end of the nozzle 49. The neutral gas (as nitrogen) which is supplied through the nozzle 49 also acts as an atomizing medium.

Means are provided for supplying hydrogen to the reaction chamber 50 separately from the supply of ferrous chloride as aforesaid. For this purpose, an orifice plate or shield 89 is provided as shown in Figs. 1 and 3 at a level spaced slightly below that of the lower end of the nozzle 49. In other words, the shield 89 is positioned adjacent to but is spaced from the nozzle. This shield, if desired, may be suitably secured to inwardly extending lugs 90 by bolts or otherwise, the lugs 90 being formed on, or in any event rigid with, the walls of the reaction chamber 50. The orifice plate or shield 89 has formed therein a central orifice 91 as shown, which may be formed in part by a cylindrical portion 92, and in part by a tapering or a frusto-conical portion 93. Furthermore, if the orifice plate 89 is of substantial thickness as shown in Fig. 3, a recess as indicated at 94 may be formed therein concentric with the orifice 91 so that the thickness of the metal through which the orifice 91 is formed is less than that of the remainder of the orifice plate. This recess preferably has sloped or frusto-conical shaped sides as shown. Supported upon the orifice plate or shield 89 and preferably suitably secured to the orifice plate as by welding is an upwardly extending sleeve member 95, the upper end of which is arranged to conform to the outside contour of the nut member 71. This sleeve member 95 has a plurality of apertures 96 formed therein for the flow of hydrogen from outside the sleeve member to the annular space surrounding the end of the nozzle and between it and the orifice plate. The connection between the orifice plate 89 and the lugs 90 is made adjustable by slots provided in one of these members and bolts passing therethrough into the other. By making these slots of some substantial width as well as generally concentric with the reaction chamber, the orifice 91 may be accurately positioned in alignment with the nozzle 49 and the orifice plate 89 rotated until the upper end of the sleeve member 95 will accurately conform to the outside shape of the nut member 71.

The orifice plate or shield 89 also serves a very important function, in addition to its function in forming one boundary of the annular passage through which the hydrogen is introduced as aforesaid. This additional function is to serve to prevent recycling or eddy currents within the reaction chamber from bringing material into contact with the tip portion of the nozzle, which may in practice adhere thereto and which will in the course of time build up a deposit on the nozzle tip, preventing further operation.

Means are provided for supplying hydrogen, which may be heated to a desired temperature substantially the same as or in some instances above the desired temperature for the reaction. For this purpose, hydrogen may be supplied from any suitable source through a pipe 97 under control of a conventional valve 98, Fig. 1. The pipe 97 is shown passing through the combustion chamber of the upper furnace 14. While, as shown, it passes directly therethrough, it is contemplated that any desired length of this pipe may be disposed within the upper furnace, so as to afford the necessary time for heating the hydrogen flowing therethrough to a desired temperature. It is contemplated that a substantial proportion of the heat necessary for the reaction may be supplied as sensible heat of the hydrogen. As shown, the pipe 97 leads to the upper end of the reaction chamber 50 above the baffle provided therein by the orifice plate 89. This portion of the reaction chamber surrounding the nozzle and its associated means, thus acts as a plenum chamber for hydrogen. Due to the fact that this portion of the reaction chamber is exposed on the outside to temperatures in the central chamber combustion space 23 of the furnace 21, the hydrogen is somewhat further heated while flowing through this plenum chamber. The provision of heated gases surrounding the nozzle prevents cooling of materials flowing therethrough as aforesaid. The hydrogen passes from this plenum chamber through the holes 96 in the sleeve member 95 and thence downwardly through the orifice 91, being induced to flow through the latter in part at least by the force of the nitrogen and ferrous chloride flowing therethrough, and being shielded from undesired premature contact with ferrous chloride by the annular stream of nitrogen until the ferrous chloride has been broken up into small droplets and those droplets have passed beyond the nozzle and preferably substantially beyond the orifice 91.

From the foregoing it will be seen that there is provided a means by which ferrous chloride may be melted and the molten material caused to flow under a predetermined hydrostatic pressure through a nozzle into a reaction chamber. While the means disclosed is essentially of a batch type, rather than continuous, it is contemplated that the present process may be carried on in a substantially continuous manner by providing a continuous supply of ferrous chloride in a molten state such as could be done in many ways, which will suggest themselves to those skilled in the art from the foregoing description.

There has been illustrated and described in some detail a means by which ferrous chloride may be shielded from premature initial contact with hydrogen by the use of an annular shielding stream of a neutral or inert gas, such as nitrogen. Mixtures of neutral gases are also contemplated for use in this connection.

Furthermore, while there has been shown in the drawings and particularly described an arrangement by which molten ferrous chloride may be atomized by the use of an atomizing gas, nitrogen being preferred in the present case, it is contemplated that other means of breaking up the molten ferrous chloride into the form of small droplets can be employed, if so desired, in accordance with the process of the present invention. Such other forms might, for example, comprise the use of the hydrostatic pressure of the ferrous chloride alone to effect a desired breaking up of the molten material into small particle size. In this connection, it is noted that provision is made for supplying a predetermined hydrostatic pressure to the ferrous chloride as supplied to the nozzle. Any means usable for supplying the ferrous chloride to the nozzle under a desired hydrostatic pressure, coordinated with the type of nozzle and type of means used in breaking up the ferrous chloride into small particle size, is to be considered within the purview of the present invention, at least from the point of view of process, and also from the point of view of apparatus when the latter is considered in its broader phases.

While in most instances there will be substantially atmospheric pressure or a pressure very slightly thereabove existing in the reaction chamber, and while the hydrostatic pressure effective upon the ferrous chloride in the container 29 will usually be a predetermined super-atmospheric pressure, the essential characteristics as to the establishment and maintenance of hydrostatic pressure is that there be a predetermined differential hydrostatic pressure effective on the ferrous chloride in the container 29 in respect to the pressure existing in the reaction chamber. It is contemplated, for example, that a sub-atmospheric pressure may be desired in the reaction chamber, while the pressure above the ferrous chloride in the container 29 may be some greater absolute pressure, and may be either greater or less than atmospheric. On the other hand, in some instances it may be that a positive pressure in respect to atmospheric pressure may be desired in the reaction chamber and a greater positive pressure may then be used effectively upon the ferrous chloride in the container 29.

In the event that any pressure below atmospheric is to be used in the reaction chamber, it is usually preferred that an outer container be provided surrounding the reaction chamber, so as to provide an intervening space to be filled with a neutral gas. The purpose of this is in the event that the reaction chamber should leak, any gas passing thereinto should be neutral in character, so as to prevent a possible explosion, which might occur if air or other oxygen-containing gas were permitted to leak into the reaction chamber and combine violently with the hydrogen therein. This additional chamber or outer container surrounding the reaction chamber for containing the neutral gas, such as nitrogen, in the intervening space is not shown in the accompanying drawings, but may be provided in any way which will be obvious to those skilled in the art from the foregoing description.

Further, while there has been disclosed means comprising an annular stream of an inert gas for preventing premature contact between the ferrous chloride and hydrogen, it is contemplated that some mechanical shielding means could be used for this purpose, including, for example, means by which hydrogen is supplied to the reaction chamber separately from the ferrous chloride and in a manner such that circulatory currents of hydrogen may not move in such manner as to cause contact between hydrogen and ferrous chloride until the latter has been broken up into small droplets as aforesaid and is dispersed in the atmosphere in the reaction chamber.

Means have been shown and described for heating not only the ferrous chloride, but also the nitrogen or other inert gas, and/or the hydrogen supplied to the reaction chamber. In some instances one or both these gases may be supplied without preliminary heating, it being necessary in such instance, however, to supply the heat necessary for the reaction in some other way. It is contemplated that the ferrous chloride will be supplied to the reaction chamber at a temperature between its melting point and its boiling point under the pressure conditions prevailing. Any temperature in this range is contemplated for use in accordance with the present invention. As stated hereinabove, the desired reaction of reducing ferrous chloride with hydrogen to form elemental iron and gaseous hydrogen chloride (HCl) is endothermic in character. As such, therefore, heat must be supplied to permit the reaction to carry on. It is usually contemplated that this heat will be supplied primarily at least as sensible heat in the ferrous chloride and in the gases supplied to the reaction chamber. In some instances additional heat may be supplied either through the wall of the reaction chamber or by some heating means (not shown) arranged to supply or generate heat in such chamber. Broadly, any of these arrangements are to be considered within the purview of the appended claims which are not specifically further limited. One possible arrangement is that in which the reaction is carried on in an adiabatic manner, that is, no heat is supplied to the reaction chamber except as sensible heat in the materials supplied thereto. It is usually desired at least to prevent heat loss from the materials in the reaction chamber outwardly through the walls thereof. For this reason, the reaction chamber 50 is shown disposed within the lower furnace 21, and heating means are provided, comprising the burners 25, for maintaining the temperature of the outside of the walls of the reaction chamber at such a point as to prevent heat flow outwardly through these walls. In other words, the temperatures of both sides of the chamber walls should be kept substantially the same in accordance with a preferred embodiment of the process of the present invention.

The elemental iron formed as a product of the present process will collect to a large extent at least within the receiving chamber 54 formed as a downward extension of the reaction chamber and may be cleaned out from time to time by opening the valve 55 and suitably removing this iron. It has been found that this iron is usually in the form of a spongy deposit on the walls, which is quite friable and easily crushed even by the pressure of the fingers into a very fine powder. This iron powder is usable for a number of different purposes including, for example, powder metallurgy. The gaseous products of the reaction and unreacted materials pass through the pipe 56 and may be disposed of, separated and used in whole or in part in ways which form no part of the present invention.

While there is described herein certain apparatus; and some equivalents have been suggested to the extent now known; and while the process has been described in its essential principles and character, it is contemplated that equivalents, both of the apparatus and the process, or parts of either or both, will suggest themselves to those skilled in the art from the foregoing description. The appended claims are intended, therefore, to be construed to include all such equivalents and further to be construed validly as broadly as the state of the prior art permits.

What is claimed is:

1. The process of reducing ferrous chloride to metallic iron, comprising the steps of introducing molten ferrous chloride through a nozzle into a reaction chamber defined by walls, by breaking up said molten ferrous chloride into small droplets after it has emerged from the nozzle, and projecting said droplets into said chamber, introducing gaseous hydrogen into said chamber separately from said ferrous chloride, and simultaneously introducing into said chamber an annular stream of neutral gas in a manner such that said annular stream surrounds the ferrous chloride as it emerges from said nozzle, so as to prevent premature initial contact between said gaseous hydrogen and said ferrous chloride until the latter has been broken up into droplets and has passed away from said nozzle and until said droplets are dispersed in the atmosphere of said chamber spaced from the walls thereof.

2. The process in accordance with claim 1, wherein said neutral gas is nitrogen.

3. The process in accordance with claim 1, wherein said neutral gas is introduced into said chamber in a manner surrounding and directed toward the ferrous chloride introduced thereinto through said nozzle, so as not only to prevent premature initial contact between the ferrous chloride and hydrogen as aforesaid, but also so that said neutral gas may be effective to atomize said molten ferrous chloride.

4. The process in accordance with claim 1, wherein said neutral gas is nitrogen; wherein the nitrogen, prior to its introduction into said reaction chamber, is heated to a temperature approximating that of said molten ferrous chloride; and wherein the heated nitrogen is introduced into said chamber in a manner surrounding and directed toward the ferrous chloride introduced into said chamber through said nozzle, so as not only to prevent premature initial contact between the ferrous chloride and hydrogen as aforesaid, but also so that said neutral gas may be effective to atomize said molten ferrous chloride.

5. The process in accordance with claim 1, wherein said hydrogen and said neutral gas are respectively controlled as to their respective temperatures prior to their introduction into said reaction chamber; and wherein said molten ferrous chloride is heated to a predetermined temperature at which it will exist in the molten state, so that the sensible heat introduced into said reaction chamber with said hydrogen, said neutral gas, and said molten ferrous chloride will supply heat required for the maintenance of the endothermic reaction between the hydrogen and the ferrous chloride.

6. Apparatus for reducing ferrous chloride to metallic iron, comprising walls defining a reaction chamber, a nozzle for projecting molten ferrous chloride into said chamber, means for supplying ferrous chloride in a molten state to said nozzle and therethrough into said chamber, means for imposing a predetermined differential hydrostatic pressure onto said molten ferrous chloride as supplied to said nozzle in respect to the pressure in said reaction chamber, means including said hydrostatic pressure imposing means for breaking up said molten ferrous chloride into small droplets as it is discharged from said nozzle, means for separately supplying hydrogen to said chamber to react with said ferrous chloride, a shield spaced from and adjacent to said nozzle and having an opening therein in alignment with said nozzle for protecting the tip portion of said nozzle from recycling material in said reaction chamber, and means for removing from said chamber products of the reaction between ferrous chloride and hydrogen and any remaining unreacted materials supplied to said chamber.

7. Apparatus for reducing ferrous chloride to metallic iron, comprising walls defining a reaction chamber, a nozzle for projecting molten ferrous chloride into said chamber, means for supplying ferrous chloride in a molten state to said nozzle and therethrough into said chamber, means for imposing a predetermined differential hydrostatic pressure onto said molten ferrous chloride as supplied to said nozzle in respect to the pressure in said reaction chamber, means including said hydrostatic pressure imposing means for breaking up said molten ferrous chloride into small droplets as it is discharged from said nozzle, means for separately supplying hydrogen to said chamber to react with said ferrous chloride, means for supplying an annular stream of an inert gas surrounding the molten ferrous chloride as it is discharged from the nozzle, so as to prevent premature initial contact between said hydrogen and the ferrous chloride until the latter has been broken up into small droplets and those droplets have moved away from said nozzle, and means for removing from said chamber products of the reaction between ferrous chloride and hydrogen and any remaining unreacted materials supplied to said chamber.

8. Apparatus for reducing ferrous chloride to metallic iron, comprising walls defining a reaction chamber, a nozzle for projecting molten ferrous chloride into said chamber, means for supplying ferrous chloride in a molten state to said nozzle and therethrough into said chamber, means for imposing a predetermined differential hydrostatic pressure onto said molten ferrous chloride as supplied to said nozzle in respect to the pressure in said reaction chamber, means including said hydrostatic pressure imposing means for breaking up said molten ferrous chloride into small droplets as it is discharged from said nozzle, means for separately supplying hydrogen to said chamber to react with said ferrous chloride, means for supplying an annular stream of an inert gas surrounding the molten ferrous chloride as it is discharged from the nozzle, so as to prevent premature initial contact between said hydrogen and the ferrous chloride until the latter has been broken up into small droplets and those droplets have moved away from said nozzle, said means for separately supplying hydrogen to said chamber including a transversely disposed shield having an opening therein in alignment with said nozzle, said shield being spaced from and adjacent to said nozzle, and said shield serving to protect the tip portion of said nozzle from recycling material in said reaction chamber, and means for removing from said chamber products of the reaction between ferrous chloride and hydrogen and any remaining unreacted materials supplied to said chamber.

9. Apparatus for reducing ferrous chloride to metallic iron, comprising walls defining a reaction chamber, a nozzle for projecting molten ferrous chloride into said chamber and having a passage for said molten ferrous chloride extending centrally axially therethrough, means for supplying ferrous chloride in a molten state to said nozzle and therethrough into said chamber, means for imposing a predetermined differential hydrostatic pressure onto said molten ferrous chloride as supplied to said nozzle in respect to the pressure in said reaction chamber for causing and controlling the flow of said molten ferrous chloride through said nozzle, means for separately supplying hydrogen to said chamber to react with said ferrous chloride therein, means for supplying a neutral atomizing gas through said nozzle so as to issue therefrom as an annular stream concentric with said passage for ferrous chloride through said nozzle and directed so as to intersect the stream of ferrous chloride flowing from said nozzle through said passage at a point spaced a predetermined distance beyond said nozzle, so that said neutral gas will act to atomize said molten ferrous chloride and also to shield said ferrous chloride from premature initial contact with the hydrogen supplied as aforesaid until said ferrous chloride has passed beyond said nozzle and has been atomized into small droplets, and means for removing from said chamber products of the reaction between ferrous chloride and hydrogen and any remaining unreacted materials supplied to said chamber.

10. Apparatus in accordance with claim 9, comprising in addition, means for heating said neutral atomizing gas to a predetermined temperature, approximating that at which said molten ferrous chloride is supplied to said chamber.

11. Apparatus in accordance with claim 8, comprising in addition, means for supplying heat to the outside of said reaction chamber, so as to maintain the walls thereof at a predetermined temperature coordinated with the temperature which is to be maintained within the chamber for the maintenance of the reaction therein between hydrogen and ferrous chloride, so as substantially to prevent loss of heat through the walls of said reaction chamber.

12. Apparatus for reducing ferrous chloride to metallic iron, comprising walls defining a reaction chamber, a nozzle for projecting molten ferrous chloride into said chamber and including an axial through passage for said molten ferrous chloride, a heating chamber to which ferrous chloride may be supplied and in which it is melted, means for supplying heat to said heating chamber to melt ferrous chloride therein, means for supplying a gas under a predetermined pressure above said ferrous chloride in said heating chamber to force molten ferrous chloride therefrom, a passage from said heating chamber to the axial passage of said nozzle for supplying molten ferrous chloride from said heating chamber to said nozzle, an annular passage in said nozzle concentric with said axial passage therein for the supplying of a shielding and atomizing gas, means for conducting an inert atomizing gas to said annular passage in said nozzle, means for heating said atomizing gas en route to said nozzle, said nozzle being constructed and arranged so that atomizing gas will be directed therefrom in a manner to intersect a stream of ferrous chloride passing from said nozzle at a point spaced a predetermined distance away from said nozzle, means for supplying hydrogen to said reaction chamber separately from the ferrous chloride supplied thereto through said nozzle, means for controlling the temperature of the hydrogen en route to said reaction chamber, means for controlling the temperature of the walls of said reaction chamber so as to maintain such temperature about the same as the temperature of the materials in said reaction chamber to prevent heat loss through the walls of said reaction chamber, and means for removing from said reaction chamber the products of the reaction between ferrous chloride and hydrogen and any remaining unreacted materials supplied to said reaction chamber as aforesaid.

13. The process in accordance with claim 1, wherein said hydrogen and said neutral gas are controlled as to their respective temperatures prior to their introduction into said reaction chamber, and comprising in addition, regulating the amount of heat supplied outside of the chamber walls, so that the chamber walls will be maintained at substantially the same temperatures as the materials within said chamber so as to minimize heat transfer between such materials and the chamber walls.

14. The process in accordance with claim 1, comprising the additional step of preventing the deposition of solid material on said nozzle by substantially preventing impingement thereon of eddy currents of the materials present in said reaction chamber.

FREDERIC M. DARNER.
CLARENCE C. WALTERS.

References Cited in the file of this patent

UNITED STATES PATENTS

| Number | Name | Date |
| --- | --- | --- |
| 2,102,382 | Roselund | Dec. 14, 1937 |
| 2,103,083 | Mullen | Dec. 21, 1937 |
| 2,111,661 | Ebner | Mar. 22, 1938 |
| 2,184,300 | Hodson et al. | Dec. 26, 1939 |
| 2,287,476 | Hodson et al. | June 23, 1942 |
| 2,418,148 | Williams et al. | Apr. 1, 1947 |

FOREIGN PATENTS

| Number | Country | Date |
| --- | --- | --- |
| 346,921 | Great Britain | Apr. 23, 1931 |

OTHER REFERENCES

Transactions of the American Electrochemical Society, vol. 51, 1927, pages 482 to 484, published by the American Electrochemical Society, New York.